Aug. 25, 1964  A. O. T. OSTRUS  3,145,744
APPARATUS FOR PROCESSING CITRUS FRUIT
Original Filed Feb. 19, 1960  2 Sheets-Sheet 1
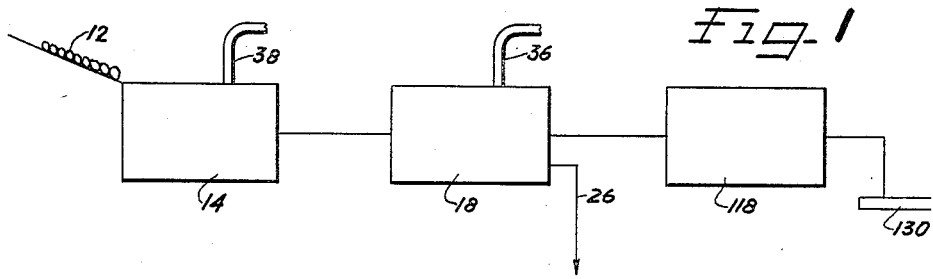
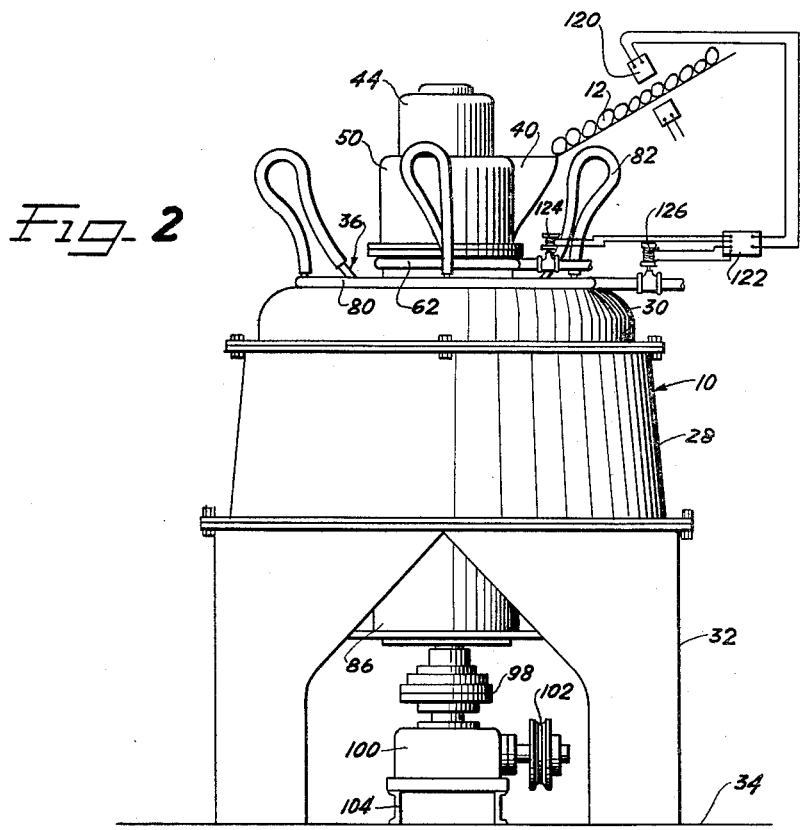
INVENTOR.
Aubrey O. T. Ostrus
BY
ATTORNEYS Aug. 25, 1964　　　　A. O. T. OSTRUS　　　　3,145,744
APPARATUS FOR PROCESSING CITRUS FRUIT
Original Filed Feb. 19, 1960　　　　　　　　　　2 Sheets-Sheet 2

INVENTOR.
Aubrey O. T. Ostrus
BY
ATTORNEYS

United States Patent Office 3,145,744
Patented Aug. 25, 1964

3,145,744
APPARATUS FOR PROCESSING CITRUS FRUIT
Aubrey O. T. Ostrus, Los Angeles, Calif., assignor to Freshway Products Company, Los Angeles, Calif., a corporation of California
Original application Feb. 19, 1960, Ser. No. 9,820. Divided and this application Aug. 28, 1962, Ser. No. 219,857
6 Claims. (Cl. 146—3)

This invention relates to apparatus for processing citrus fruit and citrus fruit peel, and more particularly to apparatus for extracting an increased proportion of the flavoring material and other volatile fluids from the produce in an entirely automatic manner.

Heretofore, various devices have been available for extracting the flavor from citrus fruit, but these devices have failed to capture the flavor to the fullest extent, with the result that an unduly large proportion of the essential oils have been volatilized and lost during processing. In certain prior art batch process devices, a product has been produced that is only $\frac{1}{25}$ the potency of the product that can be obtained by the continuous method made possible by the apparatus of my present invention.

Such apparatus includes shredding knives that effect an unusually fine cutting action so that more of the essential oils are released initially. An aqueous fluid is sprayed in adjacency to the shredding knives and desirably into contact therewith, so that the essential oils liberated from the peel of the citrus fruit are taken up immediately and are not volatilized to an undesirable extent. The present invention also includes the use of metering means to determine the amount of aqueous fluid that is mixed with the shredded fruit or peel to produce a flowable mass thereof, and this procedure not only reduces the amount of aqueous fluid that may be used for this purpose so that a higher potency is obtained, but calibrates the potency quite precisely.

The apparatus of my invention also includes a centrifugal type of filter, with means for rotating the same at a speed such that separation of the solids from the filtrate is effected continuously during operation of the filter. During such separation, an additional supply of an aqueous fluid may be sprayed against the filter to effect a more efficient separation of the flavoring materials and other volatile fluids from the pulp and albedo after shredding the fruit.

It is therefore an object of the present invention to provide improved apparatus for the continuous processing of citrus fruit, either the whole fruit or the peel alone, in a fully automatic manner for the extraction of flavoring materials and other volatile fluids from the fruit and/or peel.

A further object of the invention is to provide metering means for determining the amount of aqueous fluid to be incorporated in the shredded fruit produced in accordance with the amount of produce being processed.

A further important object of the invention is to provide apparatus that includes centrifugal type filtering means for the continuous separation of solids from filtrate, together with means for spraying the filter means with an aqueous fluid to increase the efficiency of such separation.

Other and further important objects and advantages will become apparent as the description proceeds in accordance with the drawings in which:

FIGURE 1 is a schematic showing of apparatus for carrying out the process of the present invention;

FIGURE 2 is a front elevational view, partly in diagrammatic form, of apparatus for use in practicing the process.

As shown on the drawings:

Figure 3:
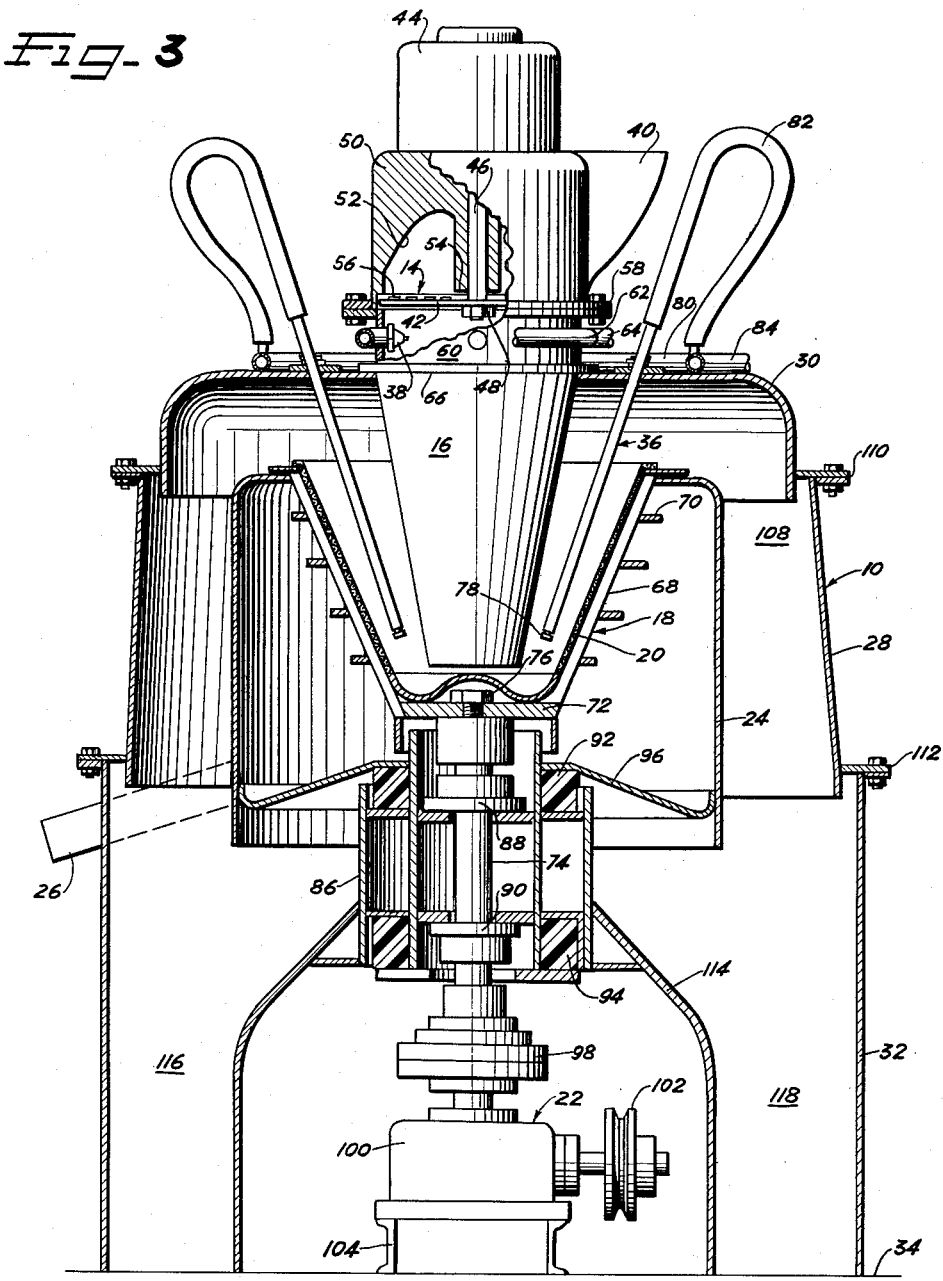
FIGURE 3 is an enlarged vertical sectional view of the apparatus shown in FIGURE 2.

With reference to the drawings and particularly to FIGS. 2 and 3 thereof, there is shown a machine 10 which is suitable for use in extracting flavoring materials and other volatile fluids from produce such as citrus fruit, including oranges, lemons, limes, and the like, indicated at 12. In accordance with the invention, as will later be more fully described, metering means are used to meter the amount of fruit being processed in the machine, or converter 10, and this information is transposed to additional devices that add directly proportional amounts of an aqueous liquid at the shredding knives for the purpose of capturing the flavoring materials and volatile fluids of the fruit. Additional devices are provided for spraying the shredded fruit while on the centrifugal type of filtering means. A conveyor device is provided for removing the separated solids following the filtering operation, all as hereinafter more fully described.

The machine 10 includes shredding knives indicated generally by the reference numeral 14, a downwardly convergent feed pipe 16 directly below the shredding knives 14, and rotatable, foraminous filter basket 18 for receiving the feed from the pipe 16. Said basket 18 includes a frusto-conical screen 20 forming an upwardly and outwardly flared wall open at its upper end. A casing 24 encloses said basket 18 for collecting the filtrate that passes through the screen 20 and delivering the same into an outlet conduit 26. An outer casing 28 surrounds the casing 24 in spaced relation thereto and includes an upper cover 30 and a lower skirt portion 32 mounted upon a base 34.

A plurality of circumferentially spaced nozzles 38 project within the feed pipe 16, near the top thereof, to spray an aqueous fluid directly into the area of the shredding knives 14 to entrain the volatile oils released at this point.

The fruit 12 is fed into a suitable inclined inlet 40 against the revolving knife-carrying disk 42 of the shredding means 14. Said disk 42 is preferably rotated at speeds in the neighborhood of 1750 r.p.m. by a motor 44 connected to the disk 42 through a drive shaft 46 and a nut 48. A housing 50, through which the drive shaft 46 extends, defines a volute chamber 52 that is relatively large adjacent the inlet 40 to receive the whole fruit and that is gradually reduced in cross-section to aid in feeding the fruit toward the shredding means 14. The base 54 of the housing 50 is spaced from the upper surface of the disk 42 a distance of $^{40}\!/_{1000}$ of an inch in a preferred embodiment of the invention, and the disk 42 carries a plurality of radially aligned and angularly spaced sets of teeth 56 which extend upwardly from the disk 42 a distance of $^{20}\!/_{1000}$ of an inch. The disk 42 is formed with openings (not shown) between successive teeth 56 to permit the shredded materials, including the albedo, to pass through the disk into the feed pipe 16.

The shredding means 14 is desirably located at a flange connection 58 between the housing 50 and the feed pipe 16. The spray nozzles 38 are located in an immediately subjacent relationship to the shredding means 14 so as to direct a "rounded" spray pattern from angularly spaced points around the upper portion 60 of the pipe 16, with the spray actually coming into contact with the cutter disk 42. In a preferred embodiment of the invention, the nozzles 38 are approximately an inch below the cutter disk 42, and four such nozzles are equally and angularly disposed around the portion 60 by means of a header 62 provided with an inlet conduit 64. By virtue of this construction, the flavoring materials and volatile oils are captured and entrained substantially as soon as released, and there is thus little loss of the oils through volatilization.

The feed pipe 16, which is in the shape of an inverted frustum of a cone, is open at both ends and arranged so that a flange 66 at the upper end rests upon the cover portion 30 of the machine 10. Said feed pipe 16 extends co-axially into the basket 18 in predetermined spaced relation to the bottom thereof to feed the shredded fruit and the entrained juices into the basket.

The basket 18 is constructed of a grid of open frusto-conical configuration inclined upwardly and outwardly in spaced relation to the pipe 16 with a plurality of axially and radially aligned ribs 68 supporting the screen 20 but sufficiently spaced from one another as not to impede the movement of juices therethrough. The ribs 68 are secured in fixed relationship by circumferentially and horizontally extending hoops 70 that are spaced apart axially by relatively large distances. The ribs 68 and hoops 70 may be secured together by welding or other suitable means for static and dynamic balance. The ribs 68 afford an aerodynamic control to assist in the separation of juices from the solids as the basket 18 rotates.

The basket 18 is also provided with a lower supporting hub 72 at the small end thereof connected to a drive shaft assembly 74 by fastening means 76 for being driven by a motor 22. The screen 20 is of suitable mesh to permit the liquid component of the material fed thereto to pass therethrough in response to centrifugal force while rejecting the solids content thereof.

A plurality of spray pipes 36 are adjustably positioned with respect to the cover 30 for extension downwardly and inwardly into the basket 18 to terminate intermediate the top and bottom of the basket. The pipes 36 are provided with nozzles 78 for directing a relatively flat fan-shaped spray toward the screen 20 of the basket 18 and further remove flavoring materials and other volatile fluids from the partially purged materials in the basket. Said pipes 36 are connected by means of flexible hose connections 82 to a circumferential header structure 80 on the cover 30. An inlet 84 serves for the introduction of the spray liquid into the header 80.

The shaft assembly 74 extends through a housing 86 which cooperates with bearing means 88 and 90 forming a part of such assembly. Shock absorber means 92 and 94 are provided within said housing 86 to afford a floating mount for the casing 24 and its associated bottom wall 96. The lower end of the shaft assembly 74 includes a drive coupler 98 driven through drive means 22, which include a speed reducer 100 and a sheave 102 for connection to a suitable source of power (not shown). The drive means 22 includes a stand 104 resting upon a supporting surface 34. The driving means serves to rotate the basket 18 at speeds from 350 to 470 r.p.m.

The casing 24, as illustrated, is a cylindrical enclosure surrounding the basket 18 for receiving and collecting the filtrate discharged from the basket. Such discharge is assisted by the centrifugal action of the basket and also by the flat sprays emanating from the nozzles 78, previously described. At the speed of rotation of the basket above indicated, the shredded fruit solids in the basket will progress upwardly along the peripheral surface of the screen 20 and will flow outwardly over the upper edge thereof and the casing 24 into the solids-receiving annular space 108 defined between the inner and outer casings 24 and 28, respectively. Said outer casing 28 is secured to the cover 30 through cooperating flange means 110 and to the lower casing 32 through cooperating flange means 112. A tunnel-forming structure 114 extends through the lower casing 32 to form two separate solids-collecting zones, with the basket drive means 22 enclosed by said tunnel-forming structure. The upper surfaces of the structure 114 slope downwardly and outwardly to assist downward movement of the solids into the collection zones 116 and 118. The tunnel-forming structure 114 supports the housing 86 and in turn is supported upon the base 34.

As shown in FIG. 2, electronic control means 120 are provided for measuring the quantity of fruit 12 introduced into the machine 10. Said means 120 may be an electronic eye control system such as is produced by Wells Industries, Inc., of North Hollywood, California, or any similar counting means familiar to those skilled in the electronic control art. The electronic control means operates through suitable relay means 122 and control means 124 and 126 to control the proportional amounts of liquid introduced into the header 62 for the sprays 38 and into the header 80 for the pipes 36 in accordance with the quantity of fruit fed into the machine 10. The control means 124 and 126 may be solenoid-operated valves, as will be understood by those skilled in the electronic art.

As illustrated diagrammatically in FIG. 1, the process of the invention includes the introduction of the citrus fruit 12 into the shredding station 14, through the sprays 38 of an aqueous liquid for capturing and entraining the flavor materials at the shredding station in amounts controlled by the devices 120, 122 and 124 in proportion to the amount of fruit being processed; the centrifuging of the resulting flowable mass at a station indicated by the reference numeral 18 with washing of the shredded fruit while on the centrifugal screen 20 of the basket 18. Reference numeral 118 indicates the collection zone for receiving the processed pulp. From the collection zone 118, the pulp may be loaded onto a conveyor diagrammatically indicated by reference numeral 130.

As an example of a specific use of the apparatus of my invention, lemons were fed into the machine 10 at the rate of approximately 100 lbs. of lemon peel a minute, and sufficient additional processing solution was added at the fruit cutter station 14 to capture the flavor in the filtrate and to produce a base containing approximately 2.5 ml. of volatile oil in 100 mls. and having a Brix of approximately 9°. The resultant base was thus approximately 25 times as concentrated as bases produced by previous procedures.

Oranges can be processed to produce a base of comparable potency to that obtained from lemons, as above.

It has been found that a fruit drink base made according to the present invention may be used in the proportion of 1 part of the base, mixed with the proper amount of sugar, acid and water, to make 100 gallons of a finished citrus drink instead of the 4 or 5 gallons possible when using prior art batch processes. All citrus flavored products for a variety of food products, may be produced in comparable high-potency ratios.

It will be understood that modifications and variations of the invention may be effected without departing from the spirit and scope of the invention as set forth in the hereunto appended claims. Where the term "fruit" is used in the claims, it will be understood to mean the whole fruit, or any part thereof including the peel, or the peel itself.

This is a division of my application Serial No. 9,820, filed February 19, 1960, now abandoned.

I claim as my invention:

1. A device of the character described, comprising:
   means for shredding fruit produce containing volatile flavors and other potable fluids and solids,
   means for spraying said shredded fruit with an aqueous liquid to aid in the retention of such volatile flavors and to produce a flowable mass containing fluids and entrained solids,
   means for filtering said flowable mass including a centrifugal type of filter having an upwardly and outwardly flared foraminous wall with a free upper edge,
   means for directing said flowable mass into said filter,
   means for rotating said filter to cause an upward and outward flow of solids over said upper edge and thereby effect a continuous separation of solids from fluids, and
   means for collecting the resulting filtrate separately from said solids.

2. A device as defined in claim 1, including:
   means for metering the quantity of aqueous liquid sprayed in proportion to the quantity of fruit produce being shredded.

3. A device of the character described, comprising:
cutting means for subdividing fruit produce, means for directing a spray of an aqueous liquid toward the underside of said cutting means to form a flowable mass of said solids and fluids, a downwardly convergent tube below said cutting means for confining said spray means and said flowable mass,
a centrifugal type filter for receiving said flowable mass from said tube and having an upwardly and outwardly divergent foraminous side wall with a free upper edge,
means for directing a spray of an aqueous liquid against said side wall,
power means for rotating said filter at such a rate as to cause solids to flow upwardly along said side wall and outwardly over said upper edge thereof and to effect the filtering of said fluids through said side wall, and separate means for collecting said solids and said fluids, respectively.

4. A device of the character described, comprising:
rotary cutting means for subdividing citrus fruit peel,
means for directing a spray of an aqueous liquid toward the underside of said cutting means to form a flowable mass of subdivided peel solids and fluids,
means confining said spray and said flowable mass to effect a downward flow of said mass,
an open top centrifugal type filter below said confining means for receiving said flowable mass therefrom,
said filter having an outwardly and upwardly flared foraminous wall terminating in an upper free edge,
means for directing a spray of an aqueous liquid against said side wall,
power means for rotating said filter at such a rate as to cause peel solids to flow upwardly along said wall and outwardly over said free edge and to effect the filtering of said fluids through said foraminous wall, and
separate means for collecting said solids and the resulting filtrate, respectively.

5. A device as defined in claim 4, wherein:
means are provided for continuously feeding citrus peel into said cutting means, and
means are provided for proportioning the amount of aqueous liquid sprayed by said spraying means to the amount of peel fed into said cutting means to continuously obtain a resulting filtrate having a desired concentration of volatile oil content.

6. Apparatus for processing citrus fruit, comprising
driven rotary cutting means horizontally arranged for finely subdividing citrus fruit peel,
means for directing a spray of an aqueous liquid against the under side of said cutting means to form a flowable mass of subdivided fruit peel solids and associated liquids,
means confining said flowable mass to effect a downward flow thereof,
an open top centrifugal type frusto-conical filter below said confining means for receiving said flowable mass therefrom,
said filter having an outwardly and upwardly flared foraminous side-wall terminating in an upper free edge,
means for directing a spray of an aqueous liquid against said side-wall,
power means for rotating said filter at such a rate of speed as to cause peel solids to flow upwardly along said side-wall and be discharged outwardly over said free edge and to effect filtering of said associated liquid through said foraminous side-wall as a filtrate, and
separate means for continuously collecting said discharged solids and the resulting filtrate, respectively.

References Cited in the file of this patent
UNITED STATES PATENTS

| | | |
|---|---|---|
| 1,170,554 | Morath | Feb. 8, 1916 |
| 2,254,455 | Sorenson | Sept. 2, 1941 |
| 2,325,779 | Kraber | Aug. 3, 1943 |
| 2,527,364 | Koffler | Oct. 24, 1950 |
| 2,942,985 | Stewart | June 28, 1960 |

FOREIGN PATENTS

| | | |
|---|---|---|
| 277,933 | Switzerland | Dec. 17, 1951 |
| 545,928 | Italy | July 9, 1956 |